United States Patent
Kuzmin

(10) Patent No.: US 10,042,728 B1
(45) Date of Patent: Aug. 7, 2018

(54) METHOD FOR COMPUTER SYSTEM STRESS ANALYSIS USING NOMINAL INPUT DATA SETS OF INCREASING SIZE

(71) Applicant: Clover Network, Inc., Sunnyvale, CA (US)

(72) Inventor: Aleksandr Kuzmin, San Jose, CA (US)

(73) Assignee: Clover Network, Inc., Sunnyvale, CA (US)

( * ) Notice: Subject to any disclaimer, the term of this patent is extended or adjusted under 35 U.S.C. 154(b) by 0 days.

(21) Appl. No.: 15/706,013

(22) Filed: Sep. 15, 2017

(51) Int. Cl.
  *G06F 11/00* (2006.01)
  *G06F 11/263* (2006.01)
  *H04L 29/06* (2006.01)
  *G06Q 20/20* (2012.01)

(52) U.S. Cl.
  CPC ........... *G06F 11/263* (2013.01); *G06Q 20/20* (2013.01); *H04L 67/42* (2013.01)

(58) Field of Classification Search
  CPC ............... G06F 11/263; G06F 11/2635; G06F 11/3664; G06F 11/3668; G06F 11/3676
  See application file for complete search history.

(56) References Cited

U.S. PATENT DOCUMENTS

| 8,793,673 B2* | 7/2014 | Gutz | G06F 8/433 717/127 |
|---|---|---|---|
| 8,856,754 B2* | 10/2014 | Klein | G06F 11/3409 717/127 |
| 8,914,515 B2* | 12/2014 | Alapati | G06F 9/5072 709/224 |
| 9,317,402 B2* | 4/2016 | Kuzmin | G06F 11/3676 |
| 2005/0283765 A1 | 12/2005 | Warren | |
| 2007/0233439 A1 | 10/2007 | Carroll | |
| 2008/0092121 A1 | 4/2008 | Derose | |
| 2009/0276763 A1 | 11/2009 | Gulwani | |
| 2010/0088684 A1 | 4/2010 | Gulwani | |
| 2010/0153925 A1 | 6/2010 | Klein | |
| 2011/0107316 A1 | 5/2011 | Gutz | |
| 2012/0060142 A1 | 3/2012 | Fliess | |
| 2013/0152043 A1* | 6/2013 | Kuzmin | G06F 8/72 717/110 |

(Continued)

OTHER PUBLICATIONS

A. Meyer, et al., The Complexity of Loop Programs, Proceedings A.C.M. National Meeting, 1967, pp. 465-469.

(Continued)

*Primary Examiner* — Elmira Mehrmanesh
(74) *Attorney, Agent, or Firm* — Daylight Law, P.C.

(57) ABSTRACT

This disclosure regards computer system stress analysis using nominal input data. A disclosed method includes applying a first nominal input data set to a computer system, processing the first data set to generate a first output data set, obtaining a count of a number of calls to a linear function block during the generation of the first output data set, and associating, in a memory, the count of the number of calls with a size of the first data set to produce a first data point. The method also includes repeating the aforementioned steps with two additional nominal input data sets of increasing size thus producing a second and a third data point in addition to the first. The method also includes generating a stress index value for the computer system using the first data point, the second data point, and the third data point.

15 Claims, 5 Drawing Sheets

(56) References Cited

U.S. PATENT DOCUMENTS

2015/0248342 A1    9/2015    Abadi

OTHER PUBLICATIONS

P. Danziger, Big O Notation, 2015.
R. Vaz, et al., Automated Big-O Analysis of Algorithms, International Conference on Nascent Technologies in the Engineering Field, 2017.
S. Barlowe, et al., O-Charts: Towards an Effective Toolkit for Teaching Time Complexity, Frontiers in Education Conference, Oct. 21-24, 2015.
S. Gayathri Devi, et al., An Abstract to Calculate Big O Factors of Time and Space Complexity of Machine Code, Second International Conference on Sustainable Energy and Intelligent System, 2011, 844-847.

\* cited by examiner

FIG. 5
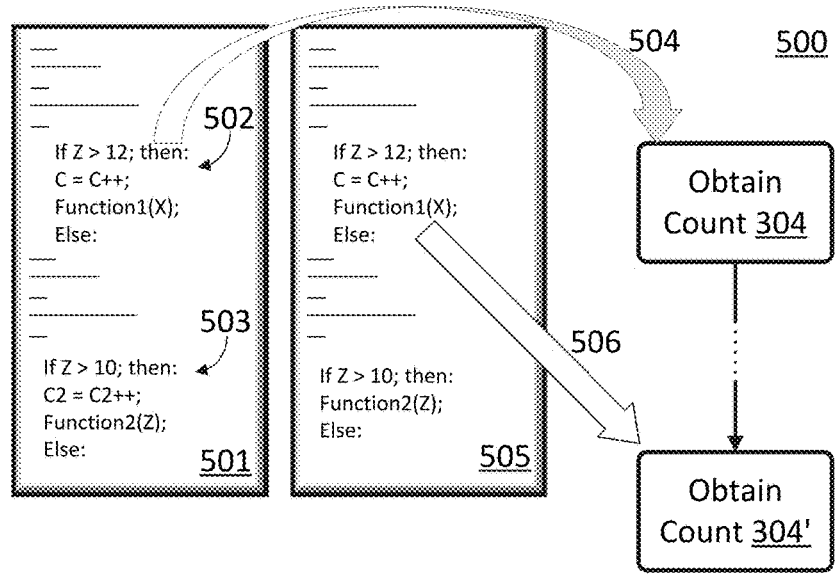
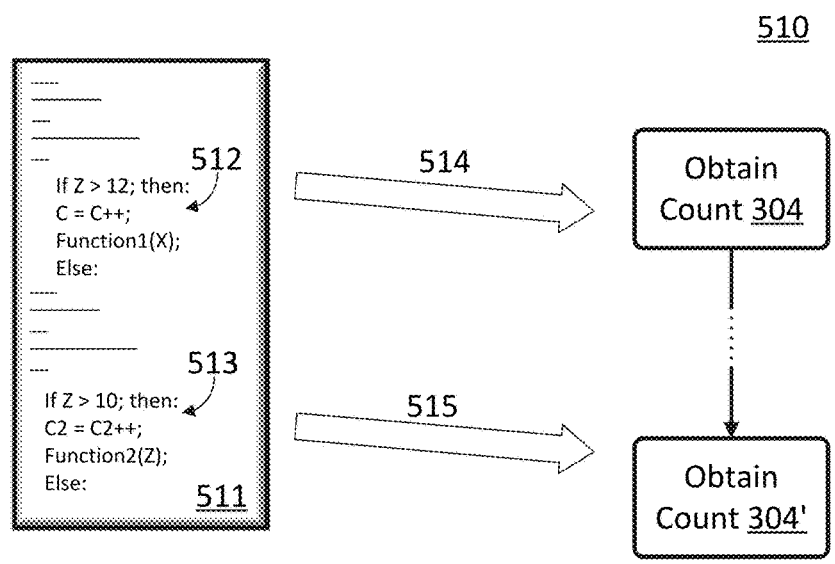

METHOD FOR COMPUTER SYSTEM STRESS ANALYSIS USING NOMINAL INPUT DATA SETS OF INCREASING SIZE

BACKGROUND

A perfect test examines a system in every possible condition the system will experience in the field. If the system passes such a test, it is guaranteed to work when deployed. However, in nearly all modern computer systems, a perfect system test is impossible. Instead, testing of modern computer systems generally relies on finding the stress points of the computer system and obtaining an estimate of how much stress the computer system can handle before it ceases to function as desired. A computer system can be determined to fail such a test if the processing time tends to spike at a certain level of input data. Although the system could be designed to only operate with input data that does not exceed that level in the field, the system should likely be revised so that it does not suddenly break under the strain of a critical mass of input data. This is particularly true given that a tendency to spike towards failure under a given level of input data is often indicative of instabilities that can crash the system even when it is operating with a moderate level of input data.

When analyzing the performance of a system in response to a given level of input data it is often important to describe the complexity of the overall algorithm represented by the computer system using Big O notation. An algorithm's complexity can be analyzed using Big O notation because it describes the worst-case scenario in terms of execution time required or memory space used for a given level of input data. A common analogy for understanding Big O is the amount of work placed on an event host for handling different tasks based on the number of people invited to the event. In this analogy, the amount of work the host does is the resource metric O(n) and the number of attendees is the amount of input data "n". Giving a toast to the attendees has a nearly constant Big O of k, greeting each attendee as they walk into the event has a linear Big O of n, and introducing each attendee to every other guest as they walk into the event has an exponential Big O of $n^2$. Determining the Big O of a system is useful for determining if the system should be revised to be less susceptible to stress, or if it needs to be protected from being overloaded when deployed in the field. However, determining the Big O complexity for any level of input data "n" requires finding the input data characteristic that causes the system to perform the worst. In other words, it requires finding the stress data for the true worst-case performance of the system. Determining what input data is most likely to stress the computing system is a problem in it of itself. As most modern computer system includes numerous function calls and variant branching logical flows it can be impossible to determine the worst-case input data with closed form analysis and time-constrained empirical analysis may not uncover the true worst-case stress data.

SUMMARY

This disclosure relates to methods and systems for computer system stress analysis. Certain approaches disclosed herein relate to conducting a stress analysis using nominal input data, thereby obviating the need to utilize custom generated idiosyncratic stress data. Nominal input data can be selected at random from a corpus of input data that has been used in the field with prior versions of the system under test or it can be randomly generated based on a basic understanding of the kinds of input data the system will face in the field. For example, if the computer system were a point of sale (POS) system the input data could be a set of randomly generated test payment card numbers, randomly generated customer information, and specific commands from user interaction flows with the POS system. Regardless of how the nominal input data is generated, the benefit of using such data is that generating stress data for a specific system can be difficult and generally it is difficult to assure that the stress data is truly the "worst" data for a specific system. Therefore, approaches disclosed herein that operate with nominal input data are not only more efficient, but also provide a higher degree of certainty in the results they produce.

FIG. 1 includes a chart 100 for the performance of a computer system comprising multiple clients 101 in communication with a server 102. In the illustrated example, the clients are point of sale (POS) terminals, and the server is a cloud platform that interacts with the POS terminals to approve payments and generally provide a cloud-enhanced POS user experience. The abscissa of chart 100 is the size of the input data applied to the system. As illustrated, the abscissas of points 103, 104, and 105 differ in terms of how much user data is being provided to the computer system at a given time. The ordinate of chart 101 is the processing time required to generate output data and complete any processing tasks associated with the applied input data. Curve 106 is the worst-case processing time for any level of input data. As illustrated, each point 103, 104, and 105 is associated with a distribution of potential processing times based on the characteristics of the applied data. In some cases, the characteristics of the data will make processing far easier than others. The distribution is illustrated to show that discovering curve 106 can be difficult as there is no guarantee that the observed processing time from any given set of input data of size "n" represents the true worst-case performance. Furthermore, even if the input data that generated output 107 was applied to the system, a tester would not know that the curve had been reached.

Certain approaches disclosed herein can generate information regarding the general characteristic of curve 106 without requiring knowledge of the stress data that will generate points such as 107. Instead, the approaches only rely on nominal input data and evaluate the computer system with multiple bodies of input data. In one approach a method includes applying a first nominal input data set to a computer system, processing the first nominal input data set to generate a first output data set, obtaining a count of a number of calls to a linear function block during the generation of the first output data set, and associating, in a memory, the count of the number of calls with a size of the first nominal input data set to produce a first data point. The method also includes repeating the applying, processing, and obtaining steps with a second nominal input data and a third nominal input data set to generate a second and a third output data set and obtain a second and third count of a second and a third number of calls. The method also includes associating, in the memory, the second count of the second number of calls with a size of the second nominal input data set to produce a second data point. The method also includes associating, in the memory, the third count of the third number of calls with a size of the third nominal input data set to produce a third data point. The method also includes generating a stress index value for the computer system using the first data point, the second data point, and the third data point. The second nominal input data set is larger than the first nominal data set. The third nominal input data set is larger than the second nominal data set.

BRIEF DESCRIPTION OF THE DRAWINGS

FIG. 1 illustrates a plot of processing time against input data size for a given computer system in accordance with the related art to illustrate the technical area towards which the present application is direct to.

FIG. 5 illustrates different approaches for executing the obtaining a counter step from the flow chart in FIG. 3 in accordance with some of the approaches disclosed herein.

DETAILED DESCRIPTION

Methods and systems for computer system stress analysis using nominal input data are disclosed. The computer system could be simulated using a testing environment. Alternatively, the computer system could be placed under evaluation by a testing environment by configuring the testing environment to apply input data to the computer system and monitor the outputs of the computer system. The stress analysis could involve applying nominal input data to the computer system, via a simulation or via actual physical application of the data to the computer system, and monitoring the processing time required to produce a set of outputs from the nominal input data. The stress analysis could involve applying multiple nominal input data sets to the computer system with each set having a different size and comparing the processing time required to produce the various sets of outputs associated with each nominal input data set. The stress analysis could involve evaluating a rate of change of processing time with respect to the size of the input data. The measured rate of change could be used as a proxy for determining the characteristic of a curve describing the worst-case processing time of the system against the input data size.

The computer system under test could be any combination of hardware and software used to process inputs and produce outputs. The computer system could include a server and a client communicating over a network. The network could be a local area network or the Internet. Communication via the network could be simulated in a testing environment. The computer system could be one or more point of sale (POS) terminals operating in communication with a cloud-based platform. The nominal input data could be user data and transaction data associated with typical user experiences with the POS terminals. The nominal input data could be generated by drawing at random from a pool of anonymized field data collected by a network of POS terminals and modifying the field data for the system under test. The nominal input data could also be generated from a basic understanding of the operation of the network of POS terminals without any bias introduced to make the data set more likely to stress the network.

Figure 1:
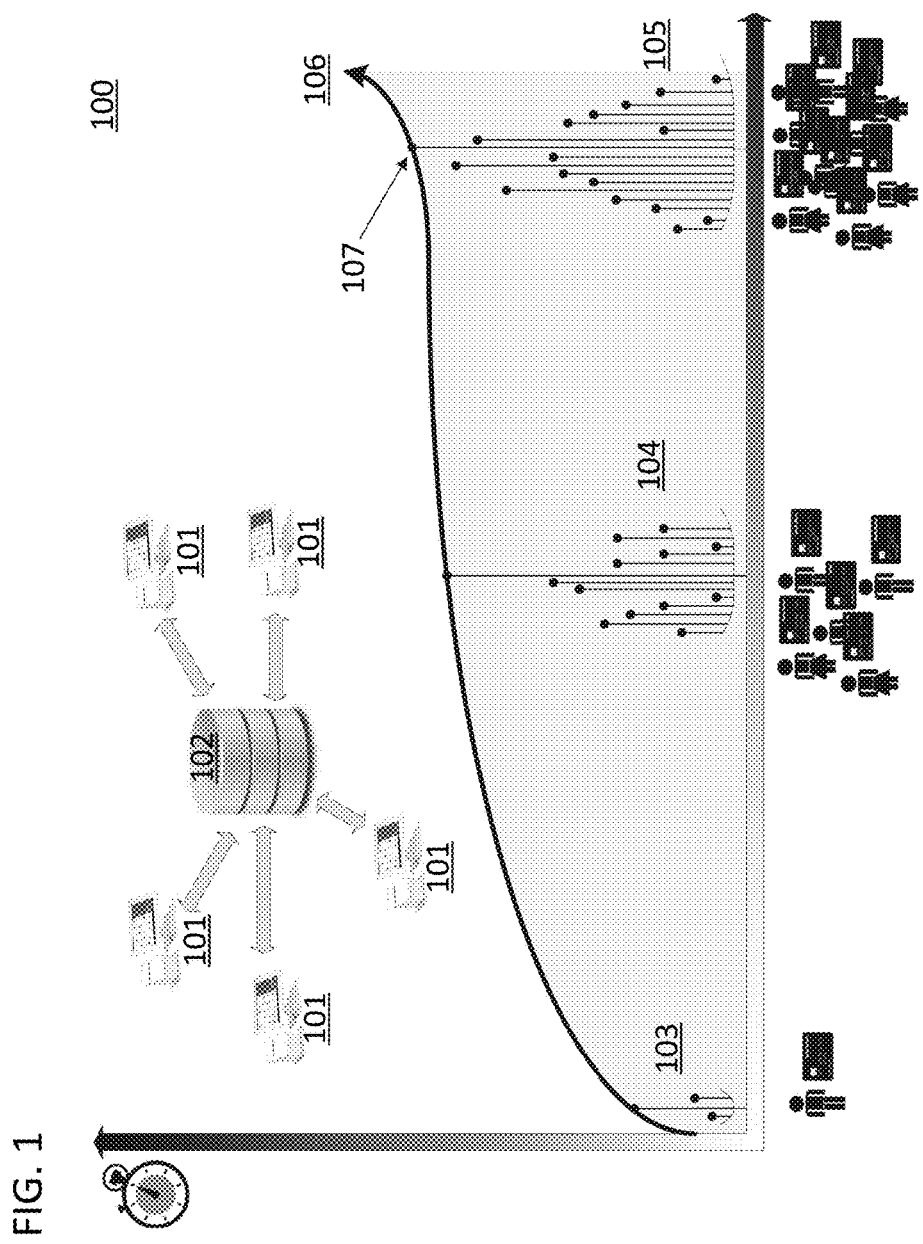
Figure 2:
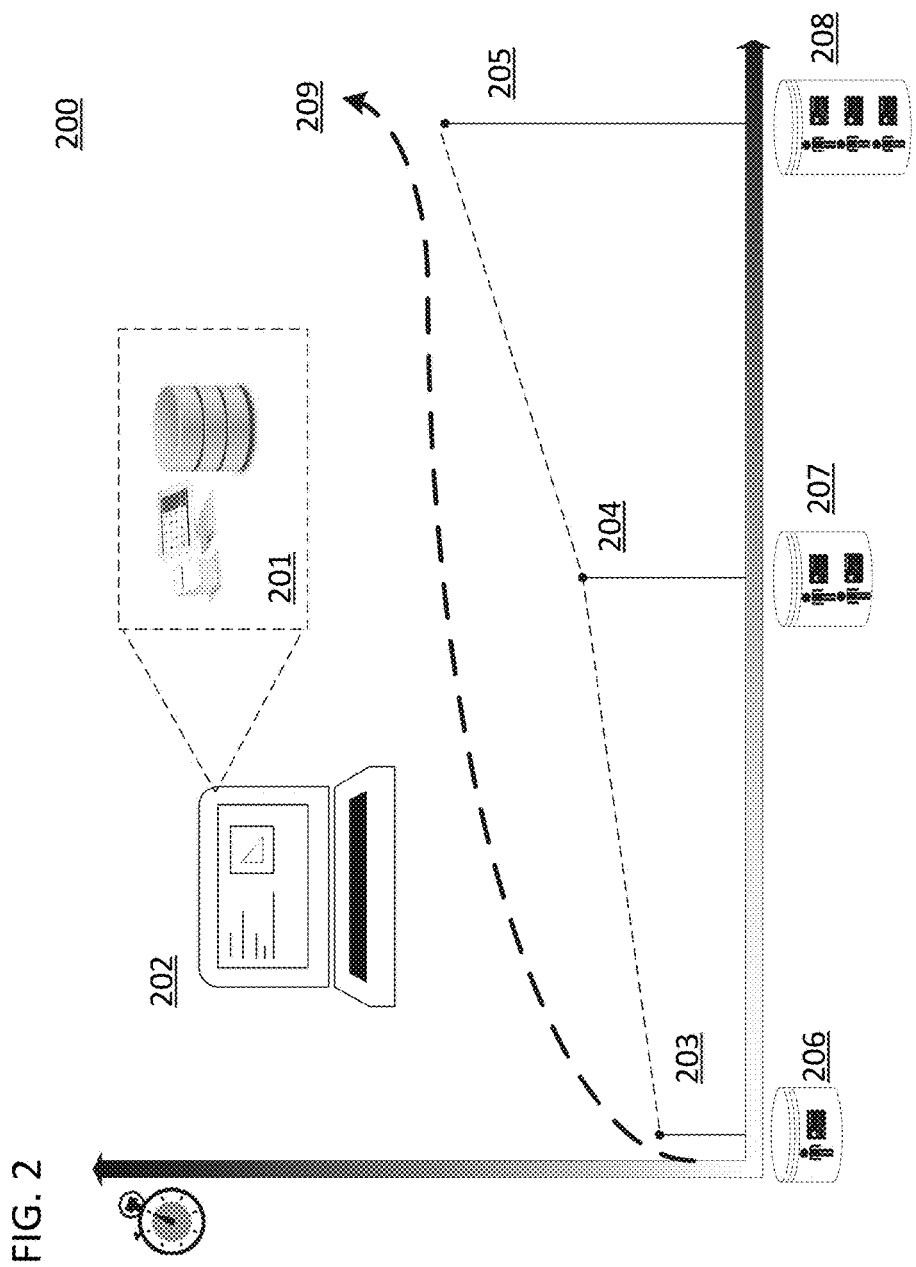
FIG. 2 illustrates a plot of processing time against input data size for a simulated computer system as simulated by a testing system with nominal input data in accordance with some of the approaches disclosed herein.

FIG. 2 includes a chart 200 for the performance of a simulated computer system 201 that is simulated in a testing environment 202. The computer system can include one or more POS terminals. The computer system can also include a network that connects the POS terminal with a server. The abscissa of chart 200 is the size of the input data applied to the system. As illustrated, the abscissas of points 203, 204, and 205 differ in terms of how much nominal input data is provided to the computer system for each simulation of the computer system. The testing environment 202 applies the various sets of nominal input data 206, 207, and 208 to the simulated computer system 201 in series and evaluates the processing time of the computer system. The ordinate of chart 200 is the observed processing time required to generate output data and complete any processing tasks associated with the applied set of nominal input data. Like the chart in FIG. 1, chart 200 includes a curve 209 of the worst-case processing time of the simulated computer system 201 for any given level of input data.

The sets of nominal input data 206, 207, and 208 differ in terms of their size, but they have the same general characteristic in that they are not generated using any process that would bias them towards stressing the computing system. The resulting output observed by testing system 202 and provided as the ordinate of each test on chart 200 is therefore not likely to be the worst-case processing time for the system. Accordingly, curve 209 is illustrated using a dotted line to reflect the fact that the true worst-case performance of the computer system is unknown. Since there was no closed-form evaluation of the computer system or active search for the worst-case stress input data for the system, there is no way to be certain of the characteristic of curve 209. However, the repeated application of nominal input data sets, and an evaluation of the output of those applications can reveal the relationship of the worst-case performance of simulated computer system 201 with a change in the size of the input data. As such, the tendency of the computer system to spike towards failure under stress can be detected indirectly using nominal input data and without the need to custom generate a set of stress data for the system.

Figure 3:
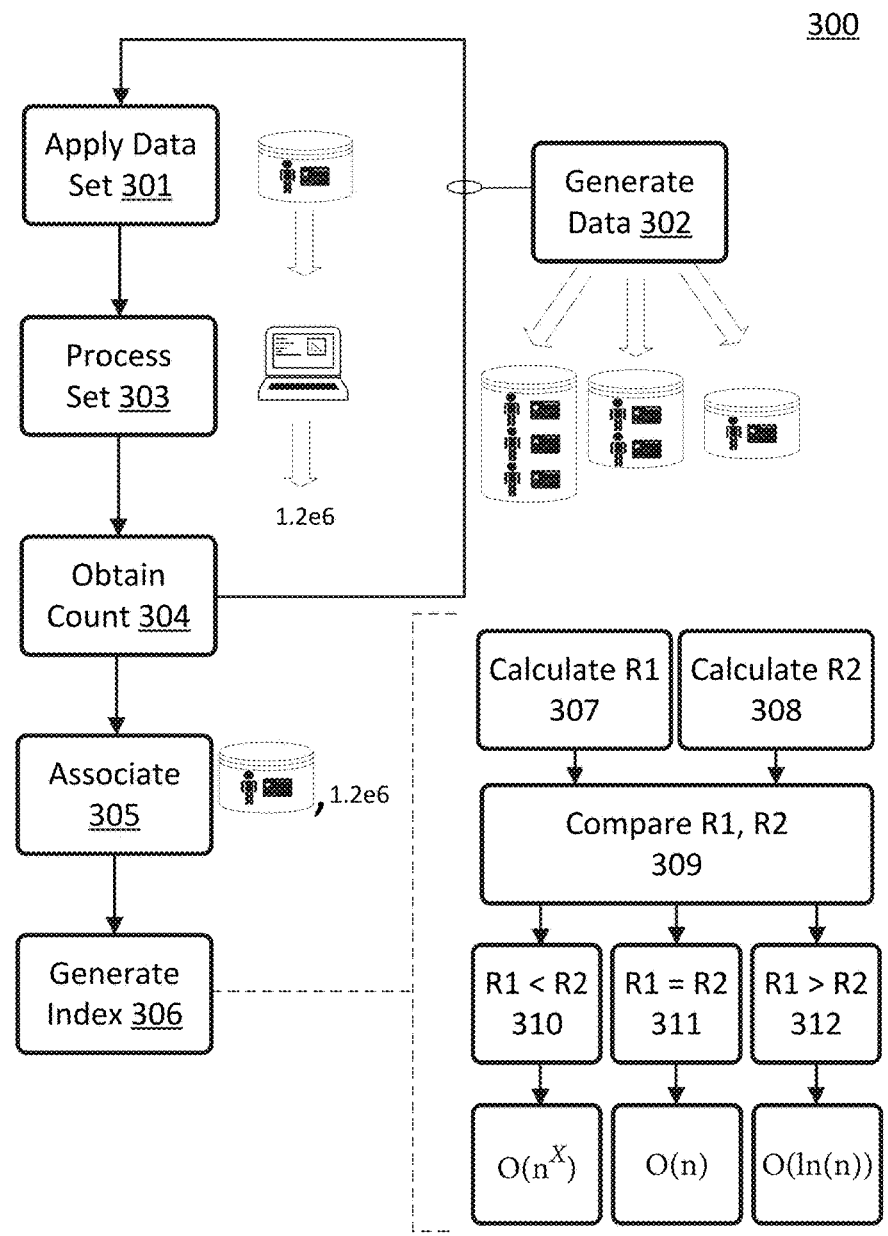
FIG. 3 illustrates a flow chart for a set of methods for conducting a stress analysis on a computer system using nominal input data in accordance with some of the approaches disclosed herein.

FIG. 3 illustrates a flow chart 300 for a set of methods for conducting stress analysis on computer systems using nominal input data. In step 301, a first nominal input data set is applied to a computer system. Step 301 can be conducting by a testing environment that either simulates the entire computer system under test or applies data to the computer system using an API interacting with test scripts and nominal input data sets. The testing environment can also apply the data to a variation of the computer system that has been modified for testing purposes to assist in the generation of meaningful outputs from the test system. For example, code modules could be added to, or activated in, the computing system to increase the amount of observable test data produced during the conduct of step 301.

The data set applied in step 301 can be taken from a database of test data stored for the purposes of conducting the stress analysis of the computer system. The test data can be randomly selected from input data obtained from use of a similar computer system that has already been deployed in the field, or from input data created exclusively for purposes of conducting the system test. The test data can be nominal input data. The test data can be generated iteratively for each iteration of the test and evaluation of the computer system or it can be batch generated prior to execution of the test. As illustrated in FIG. 3, the test data is generated iteratively in a step 302 between each application of input data to the computing system.

The test data can be generated using a test data generator with a graphical user interface for accepting rules, data type specifications, and data variation specifications from a user. By setting the rules and other specifications in the interface, the test data generator can be configured to generate data sets of different sizes with the same general characteristics. The nominal input data set can be stochastically generated using a set of rules that constrain the stochastic generator to produce meaningful data for the system. The rules can be the rules specified by the user using the graphical user interface of the test data generator. For example, if one of the entries in the nominal input data set was an expiration date for a credit card, the data could be randomly generated subject to the constraint that it be of a "date" data type and a rule limiting the date to less than 2 years in the past and no more than 7 years in the future. As another example, the input data can be randomly generated using a set of user experience flows as a scaffolding, and applying random variations in the particulars of the variables applied during that user experience. In the context of a POS system, such variables could include the prices of items purchased, the personal details of the customer, and the encryption keys utilized by the merchant.

Flow chart 300 also includes a step of processing the first nominal input data set to generate a first output data set 303. The processing step can be conducted by the computer system and can be monitored by the testing environment. In one approach, the application of the data to the computer system can be conducted by the testing environment while the actual processing is conducted by the computer system. The testing environment can be configured to determine when the nominal input data set has been completely processed. The flow chart can also discontinue at this step if a failure in processing the data is detected such as if the computer system crashes or produces a result that is not aligned with an expected output of the computer system. During the execution of processing step 303, the testing environment can obtain test data to evaluate the performance of the computer system. For example, a timer or clock cycle counter could be engaged to evaluate a processing time of the computer system. As another example, the test system could include a set of counters used to count function calls or function executions during the conduct of step 303. The source code of the computer system could be augmented to facilitate this process by including a counter that is incremented at the start of each function.

Flow chart 300 includes a step of obtaining a count of a number of calls to a linear function block during the generation of the first output data set 304. As mentioned previously, the final value obtained in step 304 would generally not be available or obtained with certainty until step 303 was complete, but the value could be generated while the computer system was processing the nominal input data set in step 303. The value obtained in step 304 could be the number of calls to the most called linear function block during the duration of step 303. However, determining that value could require monitoring every linear function block in the computer system during step 303 which might result in an unacceptable increase in test time. Alternatively, the value obtained in step 304 could be the number of calls to the most called linear function block for which calls were counted during the duration of step 303. In this approach, the execution of step 304 could be the simple selection of the largest value in a set of count values collected during step 303.

Steps 301-304 can be repeated iteratively with nominal input data sets of different sizes. For example, each step could involve the application of a larger data set to the computer system which would likely result in a larger count in step 304. In a particular approach, subsequent iterations of steps 301, 303, and 304 could be conducted differently than in the initial iteration. For example, the first execution of step 304 could involve determining which linear function block in the computer system was most called, and subsequent iterations could focus on obtaining a count of the calls to that block only. This could increase processing time because only a single counter would need to be incremented during step 303. In addition, the data obtained in step 304 would have a different characteristic since the same linear function block would be monitored as opposed to the most called linear function block in each iteration of step 303 which may be a different linear function block as will be described below. Each additional data set could be larger than the prior data set be a fixed factor such that the input data set size increased linearly. However, the size of the data sets could also increase in an irregular or exponential fashion.

Step 304 relies on a count of a number of function blocks to provide a proxy for the increase in processing time or resources consumed for changes in input data sizes. The number of calls to the most called linear function block serves as a proxy for the performance of the system because a larger number of function calls mean a larger amount of processing resource are required. In alternative applications, the processing time could be measured directly, but this may provide a misleading measurement because the computer system could be augmented for testing purposes such that a cardinal measurement of processing time would not align with the performance of the computer system. In addition, the count of function calls is indicative of the change in processing resources consumed for different input data sizes regardless of the addition of counters to the computer system.

In specific approaches, steps 301, 303, and 304 can be repeated three times to obtain three different data points. As mentioned previously, this repetition can involve generating a second and third nominal input data set by repeating step 302, or by just retrieving the additional data sets from memory and applying them using the testing environment. The data points could each consist of the count value along with the associated input data set. In particular, the data points could consist of the count values from each iteration of step 304 along with the size of the associated input data set. The flow chart could continue with a step 305 of associating the counts obtained from the repetitions of step 304 with the size of the data sets applied to the computer system in each repetition of step 301. The association could be done in a memory by storing the two values in a relational memory structure. This step could be conducted at the termination of all the iterations or it could be conducted after each repetition by adding a pair of values to a stored set of data points. These values could be associated in a memory such that the count of the number of calls from step 304 was stored with a size of the nominal input data set generated in step 302 to produce a set of data points.

Flow chart 300 terminates with a step 306 of generating a stress index for the computer system using the data points from step 305. The step could utilize three or more of these data points. The step could be conducted using a stress index value calculation script. The script could be source code provided with the testing environment and could include steps 307-311 described below. The stress index generated in step 306 can be generated based on how processing time or resource consumption appeared to increase with an increase in the nominal input data. In approaches in which the same linear function block is evaluated and a count value for the number of calls to the function block is what is considered in step 306, three data points provide a more accurate representation of the relationship of the computer system to input data because they provide a proxy for a second derivative of the complexity function. An evaluation of the three data points can serve as a proxy for the Big O of the system. The stress index can be an algorithm cost per input data size estimate. The index can be expressed as a function of input data size.

Flow chart 300 includes an exploded view of step 306 to illustrate a set of approaches by which the stress index could be generated. This set of approaches include those for which at least three iterations of steps 301-304 have been conducted. In step 307, a first ratio R1 is calculated. The ratio is a ratio of a size delta between a first and a second nominal data set and a count delta between a first count associated with the first nominal data set in step 305 and a second count associated with the second nominal data set in step 305. In approaches in which the size of the data sets and count values were data points stored in memory in step 305, the execution of step 307 would involve calculating the slope of a line between the first two data points on a graph of the count value against input data size. In step 308, a second ratio R2 is calculated. The ratio is a ratio of a size delta between the second and a third nominal data set and a count delta between the second count associated with the second nominal data set in step 305 and a third count associated with the third nominal data set in step 305. In approaches in which the size of the data sets and count values were data points stored in memory in step 305, the execution of step 308 would involve calculating the slope of a line between the second and third data points on a graph of the count value against input data size.

In step 309, a comparison is conducted between the ratios calculated in steps 307 and 308. The stress index is then generated based on this comparison. If the first ratio is less than the second ratio as in step 310, the stress index indicates that the Big O of the computer system has an exponential relationship to input data size. If the second ratio is equal to the first ratio as in step 311, the stress index indicates that the Big O of the computer system has a linear relationship to input data size. If the third ratio is less than the first ratio as in step 312, the stress index indicates that the Big O of the computer system has a logarithmic relationship to input data size.

Figure 4:
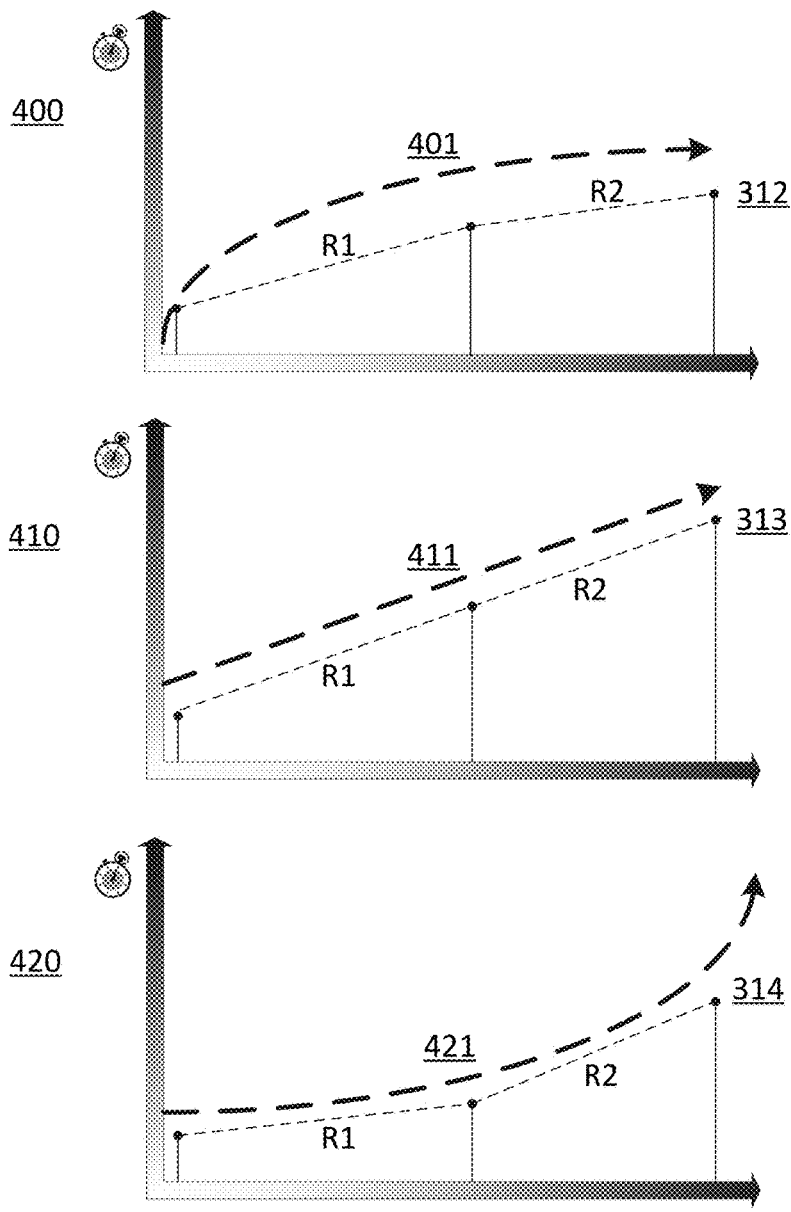
FIG. 4 illustrates three plots of processing time against input data size for three different computer systems with three different complexities in accordance with some of the approaches disclosed herein.

The manner in which the stress index generated in step 309 can relate to the Big O of the computer system is illustrated graphically in FIG. 4. Three charts 400, 410, and 420 include two curves each. The thick dotted lines 401, 411, and 421 represent the true Big O of a computer system under test where each chart shows a different computer system being subjected to a system test in accordance with some of the approaches disclosed herein. The abscissa of the three charts 400, 410, and 420 are the size of the input data applied to the system. The ordinate for the thick dotted lines in the three charts is the time it takes to process a given amount of input data. As illustrated, the worst-case performance of the first system 401 plotted in chart 400 has a logarithmic relationship to input data size, the worst-case performance of the second system 411 plotted in chart 410 has a linear relationship to input data size, and the worst-case performance of the third system 421 plotted in chart 420 has an exponential relationship to input data size.

The data points collected during three applications of input data having the same general characteristic and stochastic variation, but with different sizes, are also plotted on charts 400, 410, and 420. The ordinate for the data points are the count values obtained in each iteration of step 304 for each of the three computer systems under test. As seen, a computer system characterized in step 312 would be one in which the second ratio was less than the first ratio indicating that the computer system was stress resistant and stable, a computer system in characterized in step 313 would be one in which the two ratios were equal indicating that the system was stable but not as stress resistant, and a computer system characterized in step 314 would be stress susceptible and not stable. Therefore, computer systems characterized in step 314 would likely need to be revised or modified before being deployed.

FIG. 4 also shows how the stress index generated in step 306 provides a general indication of the characteristic of a computer system's Big O without finding any points that are actually on the worst-case performance frontier defined by a closed form description for the computer system's Big O. Evaluating a change in the ratio of count value to input data size allows the testing system to cancel out many factors that would otherwise effect an accurate description of the computer system's complexity. Specifically, any bias in the manner in which the test data was generated that affects processing time will tend to be screened out by this analysis because they will be common to both readings. Therefore, any bias in the manner in which the test data is generated is, at least to a first order perspective, cancelled from the testing system using this approach, and it no longer matters that the test data is not custom-made stress data for the computing system.

As seen in FIG. 4, three iterations of the testing loop with nominal input data can provide information concerning a rate of change of processing resources consumed by a computer system under test. In addition, multiple iterations of the testing loop and a comparison of all of data points can provide even more detailed information concerning the system. For example, additional iterations can be run with data input set sizes that are half-way between the size of a prior two set of data sets that were applied to the system. In addition, an entire second set of iterations can be conducted with data having a different generation characteristic or bias. Such approaches could be time consuming, but they would provide a check to make sure that comparisons of the ratios were indeed filtering out the effect of any bias introduced by the characteristics of the input data. In short, if different input data sets with different characteristics or biases produced a different stress index it would be immediately apparent that the input data set data characteristic was not being completely screened from the stress index and further investigation would be required.

The count value for the data points mentioned above can be generated and obtained in various ways. In some approaches, the count values are generated by counters. The counters can be embedded in a set of linear function blocks in a source code of the computer system. For example, diagram 500 in FIG. 5 illustrates a source code of the computer system 501 with two counters C and C2 embedded in linear function blocks 502 and 503. Obtaining the count values for an iteration of step 304 can involve resetting the set of counters, incrementing the counters as the source code is executed, and selecting, upon completing the processing of the nominal input data set, the largest value from the set of counters. The incrementing of the counters could be conducted during an iteration of step 303 while the nominal input data is being applied to the system. To use the example of diagram 500, linear function block 503 could have been the most frequently executed function in source code 501 such that obtaining the count value in step 304 involved selecting the value for C when all of the data in the nominal input data set had been processed. This is shown pictorially by arrow 504 to indicate the selecting of the value associated with counter C after source code 501 had been executed with the applied input data.

The count values can be obtained in different ways on subsequent iterations. In certain cases, the counters or other mechanism used to generate the set of counters can be paired down to a single counter or smaller set of counters on later iterations. In specific approaches, data obtained during the first iteration can be used to select only the highest value counter or set of highest valued counters to be counted on subsequent iterations. As illustrated in diagram 500, this could involve subsequent iterations using different source code such as source code 505 in which the counter associated with linear function block 503 was removed from the source code in order for the second iteration to run more efficiently. In approaches in which only the largest counter was kept, later iterations of step 304, such as the illustrated step 304', could simply involve retrieving the value for counter C from memory upon completion of the processing of the subsequent set of nominal input data. This step is illustrated by arrow 506 in FIG. 5.

In other cases, the same mechanism could be used to generate the set of counters on subsequent iterations (i.e., the application of different sized nominal input data sets to the computer system). However, the actual process of selecting the value for the subsequent count may be conducted differently. For example, the step illustrated by arrow 504 could be conducted, on a subsequent iteration, regardless of the value of C2. In other words, the process of obtaining the count value a subsequent time 304' would involve selecting the value of the counter that was selected in a prior iteration regardless of the relative size of that value in the current iteration.

In other applications, the same process will be applied on each iteration of the testing system. However, the same counter might not be selected in the subsequent iterations. Diagram 510 shows a situation in which source code 511 is applied in both iterations with two different sets of nominal input data. In a first iteration, a first counter associated with a first code block 512 is the highest value and is selected to be the stored count value for that iteration as illustrated by arrow 514. In a second iteration, a second counter associated with a second code block 513 has the highest value as is selected to be the count value for that iteration as illustrated by arrow 515. Furthermore, in some approaches, the same counter will be selected and used as part of the data point used to generate the stress index for the computer system, but other counters will still be monitored and compared against that main counter. The purpose of keeping track of other counters even when the same counter will be used is to provide a double check on the variation produced by the different data sets. If the different data sets produce widely differing relative values for two different counters it may serve as an indication that there is a bias in the input data generator that is not being screened by evaluating a change in the ratio of count value to input data size, and the characteristics of the input data may need to be adjusted if such a condition is detected.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device, a workstation, or a network accessible memory. Any of the method steps discussed above can be conducted by the testing environment operating in combination with the computer system or while simulating the computer system within the testing environment. Although examples in the disclosure were generally directed to a testing environment analyzing the performance of a POS system, the approaches could can be directed to a testing environment for analyzing any computer or computerized system. These and other modifications and variations to the present invention may be practiced by those skilled in the art, without departing from the scope of the present invention, which is more particularly set forth in the appended claims.

What is claimed is:

1. A method comprising:
applying a first nominal input data set to a computer system;
processing the first nominal input data set to generate a first output data set;
obtaining a count of a number of calls to a linear function block during the generation of the first output data set;
associating, in a memory, the count of the number of calls with a size of the first nominal input data set to produce a first data point;
repeating the applying, processing, and obtaining steps with a second nominal input data set to generate a second output data set and obtain a second count of a second number of calls, wherein the second count of a second number of calls is indicative of a change in processing resources consumed for a first change in input data set size;
associating, in the memory, the second count of the second number of calls with a size of the second nominal input data set to produce a second data point;
repeating the applying, processing, and obtaining steps with a third nominal input data set to generate a third output data set and obtain a third count of a third number of calls, wherein the third count of a third number of calls is indicative of a second change in processing resources consumed for a second change in input data set size;
associating, in the memory, the third count of the third number of calls with a size of the third nominal input data set to produce a third data point; and
generating a stress index value for the computer system using the first data point, the second data point, and the third data point;
wherein the second nominal input data set is larger than the first nominal input data set;
wherein the third nominal input data set is larger than the second nominal input data set;
wherein the generating the stress index value comprises:
calculating a first ratio of: (i) a size delta between the first and second nominal input data sets; and (ii) a count delta between the first count and the second count;
calculating a second ratio of: (i) a size delta between the second and third nominal input data sets; and (ii) a count delta between the second count and the third count; and
comparing the first ratio and the second ratio;
wherein the stress index is an algorithm cost per input data size estimate;

wherein the second nominal input data set is larger than the first nominal input data set by a factor;
wherein the third nominal input data set is larger than the second nominal input data set by the factor;
wherein the algorithm cost per input data size estimate is logarithmic when the first ratio is larger than the second ratio;
wherein the algorithm cost per input data size estimate is linear when the first ratio is equivalent to the second ratio; and
wherein the algorithm cost per input data size estimate is exponential when the first ratio is smaller than the second ratio.

2. The method of claim 1, wherein:
the computer system includes a client and a server; and
the first, second, and third nominal data sets are stochastically generated using a test data generator.

3. The method of claim 2, wherein:
the client is an operating system for a point of sale terminal in a point of sale system;
the server is a cloud platform for the point of sale system; and
the first, second, and third nominal data sets are each correlate to sets of user experience flows for the point of sale terminal.

4. The method of claim 1, wherein obtaining the count of the number of calls comprises:
incrementing a counter in a set of counters, wherein the set of counters are embedded in a set of linear function blocks in a source code of the computer system; and
selecting, upon completing the processing of the first nominal input data set, a value from the set of counters, wherein the value is the largest value from the set of counters, and wherein the value is from the counter.

5. The method of claim 4, wherein repeating the obtaining step to obtain the second count of the second number of calls comprises:
resetting the set of counters;
incrementing the counter in the set of counters; and
selecting a second value, upon completing the processing of the second nominal input data set and regardless of the relative size of the second value to the other values in the set of counters, wherein the second value is from the counter.

6. The method of claim 4, wherein repeating the obtaining step to obtain the second count of the second number of calls comprises:
resetting the set of counters;
incrementing the counter in the set of counters; and
selecting a second value from the set of counters, upon completing the processing of the second nominal input data set, wherein the second value is the largest value from the set of counters.

7. A non-transitory computer-readable medium storing instructions, wherein execution of the program instructions by one or more processors of a computer system causes the computer system to carry out the steps of:
applying a first nominal input data set to a computer system;
processing the first nominal input data set to generate a first output data set;
obtaining a count of a number of calls to a linear function block during the generation of the first output data set;
associating, in a memory, the count of the number of calls with a size of the first nominal input data set to produce a first data point;
repeating the applying, processing, and obtaining steps with a second nominal input data set to generate a second output data set and obtain a second count of a second number of calls, wherein the second count of a second number of calls is indicative of a change in processing resources consumed for a first change in input data set size;
associating, in the memory, the second count of the second number of calls with a size of the second nominal input data set to produce a second data point;
repeating the applying, processing, and obtaining steps with a third nominal input data set to generate a third output data set and obtain a third count of a third number of calls, wherein the third count of a third number of calls is indicative of a second change in processing resources consumed for a second change in input data set size;
associating, in the memory, the third count of the third number of calls with a size of the third nominal input data set to produce a third data point; and
generating a stress index value for the computer system using the first data point, the second data point, and the third data point;
wherein the second nominal input data set is larger than the first nominal input data set;
wherein the third nominal input data set is larger than the second nominal input data set;
wherein the generating the stress index value comprises:
calculating a first ratio of: (i) a size delta between the first and second nominal input data sets; and (ii) a count delta between the first count and the second count;
calculating a second ratio of: (i) a size delta between the second and third nominal input data sets; and (ii) a count delta between the second count and the third count; and
comparing the first ratio and the second ratio;
wherein the stress index is an algorithm cost per input data size estimate;
wherein the second nominal input data set is larger than the first nominal input data set by a factor;
wherein the third nominal input data set is larger than the second nominal input data set by the factor;
wherein the algorithm cost per input data size estimate is logarithmic when the first ratio is larger than the second ratio;
wherein the algorithm cost per input data size estimate is linear when the first ratio is equivalent to the second ratio; and
wherein the algorithm cost per input data size estimate is exponential when the first ratio is smaller than the second ratio.

8. The non-transitory computer-readable medium of claim 7, wherein:
the computer system includes a client and a server; and
the first, second, and third nominal data sets are stochastically generated using a test data generator.

9. The non-transitory computer-readable medium of claim 8, wherein:
the client is an operating system for a point of sale terminal in a point of sale system;
the server is a cloud platform for the point of sale system; and
the first, second, and third nominal data sets are each sets of user experience flows for the point of sale terminal.

10. The non-transitory computer-readable medium of claim 7, wherein obtaining the count of the number of calls comprises:

incrementing a counter in a set of counters, wherein the set of counters are embedded in a set of linear function blocks in a source code of the computer system; and selecting, upon completing the processing of the first nominal input data set, a value from the set of counters, wherein the value is the largest value from the set of counters, and wherein the value is from the counter.

11. The non-transitory computer-readable medium of claim 10, wherein repeating the obtaining step to obtain the second count of the second number of calls comprises:

resetting the set of counters;

incrementing the counter in the set of counters; and selecting a second value, upon completing the processing of the second nominal input data set and regardless of the relative size of the second value to the other values in the set of counters, wherein the second value is from the counter.

12. The non-transitory computer-readable medium of claim 10, wherein repeating the obtaining step to obtain the second count of the second number of calls comprises:

resetting the set of counters;

incrementing the counter in the set of counters; and selecting a second value from the set of counters, upon completing the processing of the second nominal input data set, wherein the second value is the largest value from the set of counters.

13. A computer-implemented system for conducting a stress analysis on a computer system comprising:

a test data generator that produces: (i) a first nominal input data set; (ii) a second nominal input data set; and (iii) a third nominal input data set;

wherein a size of the third nominal input data set is larger than a size of the second nominal input data set and the size of the second nominal input data set is larger than a size of the first nominal input data set;

a test environment that applies the first, second, and third nominal input data sets to the computer system;

a set of counters in a source code of the computer system that respectively generate a first count, a second count, and a third count when the first, second, and third nominal input data sets are applied to the computer system; and a stress index value calculation script that generates a stress index value for the computer system using the first, second, and third counts;

wherein the second count is indicative of a change in processing resources consumed for a first change in input data set size;

wherein the third count is indicative of a second change in processing resources consumed for a second change in input data set size;

wherein the generating the stress index value comprises:

calculating a first ratio of: (i) a size delta between the first and second nominal input data sets; and (ii) a count delta between the first count and the second count;

calculating a second ratio of: (i) a size delta between the second and third nominal input data sets; and (ii) a count delta between the second count and the third count; and comparing the first ratio and the second ratio;

wherein the stress index is an algorithm cost per input data size estimate;

wherein the second nominal input data set is larger than the first nominal input data set by a factor;

wherein the third nominal input data set is larger than the second nominal input data set by the factor;

wherein the algorithm cost per input data size estimate is logarithmic when the first ratio is larger than the second ratio;

wherein the algorithm cost per input data size estimate is linear when the first ratio is equivalent to the second ratio; and wherein the algorithm cost per input data size estimate is exponential when the first ratio is smaller than the second ratio.

14. The system of claim 13, wherein:

the set of counters are embedded in a set of linear function blocks in a source code of the computer system; and the stress index value calculation script comprises computer-readable instructions to select a value from the set of counters, wherein the value is the largest value from the set of counters.

15. The system of claim 13, wherein:

the computer system includes a client and a server;

the client is an operating system for a point of sale terminal in a point of sale system;

the server is a cloud platform for the point of sale system; and the first, second, and third nominal data sets are each sets of user experience flows for the point of sale terminal.

* * * * *